(12) United States Patent
Kornblum et al.

(10) Patent No.: US 10,197,184 B2
(45) Date of Patent: Feb. 5, 2019

(54) FLOAT

(71) Applicant: CONTROL DEVICES, LLC, Fenton, MO (US)

(72) Inventors: Thomas M. Kornblum, Eureka, MO (US); Jeffrey P. VanHorn, Fenton, MO (US)

(73) Assignee: Control Devices, LLC, Fenton, MO (US)

( * ) Notice: Subject to any disclaimer, the term of this patent is extended or adjusted under 35 U.S.C. 154(b) by 21 days.

(21) Appl. No.: 15/235,411

(22) Filed: Aug. 12, 2016

(65) Prior Publication Data

US 2018/0045330 A1   Feb. 15, 2018

(51) Int. Cl.
| | |
|---|---|
| *F16K 33/00* | (2006.01) |
| *F16K 17/18* | (2006.01) |
| *F16T 1/00* | (2006.01) |
| *F16T 1/20* | (2006.01) |
| *F16K 31/34* | (2006.01) |
| *F16T 1/22* | (2006.01) |

(52) U.S. Cl.
CPC .............. *F16K 33/00* (2013.01); *F16K 17/18* (2013.01); *F16T 1/00* (2013.01); *F16K 31/34* (2013.01); *F16T 1/20* (2013.01); *F16T 1/22* (2013.01); *Y10T 137/3068* (2015.04); *Y10T 137/7358* (2015.04); *Y10T 137/7426* (2015.04); *Y10T 137/7433* (2015.04)

(58) Field of Classification Search
CPC .................. F16T 1/20; F16T 1/22; F16T 1/24
USPC ....... 137/192, 195, 409, 413, 429, 430, 432, 137/554
See application file for complete search history.

(56) References Cited

U.S. PATENT DOCUMENTS

| | | | |
|---|---|---|---|
| 1,714,733 A * | 5/1929 | McConnell | ............. F16K 33/00 73/322.5 |
| 2,186,923 A | 1/1940 | Hooper et al. | |
| 2,629,458 A | 2/1953 | Allen et al. | |
| 2,677,386 A | 5/1954 | Wilkerson | |
| 2,999,509 A | 9/1961 | Hankison et al. | |
| 3,203,245 A | 8/1965 | Smallpeice | |

(Continued)

FOREIGN PATENT DOCUMENTS

| | | |
|---|---|---|
| EP | 1130308 A2 | 9/2001 |
| EP | 2910867 A1 | 8/2015 |

(Continued)

*Primary Examiner* — Eric Keasel
*Assistant Examiner* — Richard K Durden
(74) *Attorney, Agent, or Firm* — Stinson Leonard Street LLP

(57) ABSTRACT

A buoyant float including a body having an interior defined in part by a side wall and a bottom extending inward from the side wall. The side wall has an upper edge defining an open top of the body. The float includes a cover sized and shaped for covering the top of the body. The cover attaches to the body to maintain the cover in position relative to the body to cover the open top. The cover has a tubular skirt extending downward and around the upper edge of the body side wall when the cover is in position covering the top of the body. An air pocket is created at an interface between the cover and the body when the float is positioned in liquid to isolate the interface from the liquid and prevent liquid from entering the hollow interior of the body through the interface.

13 Claims, 6 Drawing Sheets

(56) References Cited

U.S. PATENT DOCUMENTS

| | | | |
|---|---|---|---|
| 3,258,968 A * | 7/1966 | Woodcock | G01F 23/70 116/204 |
| 3,269,403 A | 8/1966 | Smallpeice | |
| 3,275,020 A | 9/1966 | Fujiwara | |
| 3,378,993 A | 4/1968 | Veres et al. | |
| 3,418,789 A | 12/1968 | Hoffman et al. | |
| 3,495,617 A | 2/1970 | Zifferer | |
| 3,507,098 A | 4/1970 | Veres et al. | |
| 3,610,271 A * | 10/1971 | Jarvis | F16K 33/00 134/57 D |
| 3,916,454 A * | 11/1975 | Schoepe | F16K 33/00 73/322.5 |
| 3,980,457 A | 9/1976 | Smith | |
| 3,992,941 A | 11/1976 | McGoldrick | |
| 3,993,090 A | 11/1976 | Hankison | |
| 4,069,425 A * | 1/1978 | Cushing | A47L 15/421 134/57 D |
| 4,080,986 A * | 3/1978 | Schoepe | E03D 1/33 137/426 |
| 4,082,107 A | 4/1978 | Hoffman et al. | |
| 4,112,968 A | 9/1978 | Hoffman et al. | |
| 4,136,009 A | 1/1979 | Samiran | |
| 4,729,328 A | 3/1988 | Shellenberger | |
| 4,779,640 A * | 10/1988 | Cummings | F16T 1/20 137/195 |
| 4,823,827 A | 4/1989 | Olejak | |
| 5,014,735 A | 5/1991 | Cummings | |
| 5,103,855 A | 4/1992 | Chuang | |
| 5,115,798 A | 5/1992 | Moore, Jr. et al. | |
| 5,146,947 A | 9/1992 | Vetrini | |
| 5,365,969 A | 11/1994 | Edwards | |
| 5,636,655 A | 6/1997 | Kawamura et al. | |
| 5,769,911 A | 6/1998 | Van De Vijvere | |
| 5,983,919 A | 11/1999 | Ottinger et al. | |
| 2007/0006918 A1 | 1/2007 | Yamamoto | |
| 2007/0137706 A1 | 6/2007 | Stamatakis et al. | |

FOREIGN PATENT DOCUMENTS

| | | | |
|---|---|---|---|
| FR | 2107774 A5 | 5/1972 | |
| FR | 2271495 A1 * | 12/1975 | F16T 1/24 |
| GB | 1387750 A | 3/1975 | |
| JP | H1163388 A | 3/1999 | |

* cited by examiner

FLOAT

BACKGROUND

The present invention generally relates to buoyant floats, and more particularly, to a buoyant hollow float having features for preventing liquid from entering an interior of the float.

Liquid condensate forms in many gaseous fluid handling systems. In order to ensure proper system operation, the condensate is usually separated from the gas (e.g., by gravity) and collected along with solid foreign materials in a reservoir. The accumulated liquid and materials are periodically discharged to prevent the reservoir from becoming too full, causing system backup or reservoir overflow.

Various drain systems have been used to discharge the liquid and foreign materials. One such drain system is described in U.S. Pat. No. 5,983,919, which is incorporated by reference. Typically, the drain system is fluidly connected to the reservoir. A float in the system rises and falls in response to the liquid level in the reservoir. When the float rises to a predetermined maximum level, the drain valve opens. In many cases, the float opens a pneumatic valve that permits gas in the reservoir to actuate a separate drain valve at the bottom of the reservoir to drain the accumulated liquid and foreign materials. Often filtered and dried shop air is used as the pressurized gas. This pressurized gas is introduced into the reservoir where it accumulates above the condensate.

Many systems use sealed, air tight, hollow floats, particularly when the gas in the reservoir has a relatively low pressure. Higher gas pressures may be desirable to improve drain valve performance. When relatively high-pressure gas is introduced into the reservoir of a system using a hollow float, the gas pressure may crush the float if the pressure of gas in the float is not equalized to the pressure outside the float. To combat this problem, some systems such as that described in U.S. Pat. No. 5,983,919 use solid floats made from closed cell polyurethane foam, which can endure higher pressures without crushing. These solid floats, however, can become infiltrated with condensate, affecting their buoyancy and operation. The likelihood of condensate infiltration increases with gas pressure. Thus, various features have been added to hollow floats to balance pressure inside the float with pressure outside the float. For example, openings may be provided near the top of the float to allow air to enter and escape the interior of the float. Although these features permit pressure balance in the float, condensate can also enter the hollow interior of the float through the opening, increasing float weight and hindering operation. Thus, there is a need for a hollow float having features that permit pressure balance while preventing condensate from entering the float.

SUMMARY

In one aspect, a buoyant float comprises a body having an interior defined in part by a tubular side wall and a bottom extending inward from the tubular side wall. The side wall has an upper edge defining an open top of the body for providing access to the interior. The float also comprises a cover sized and shaped for covering the open top of the body. The cover is configured for attachment to the body to maintain the cover in position relative to the body to cover the open top of the body. The cover has a tubular skirt extending downward and around the upper edge of the body side wall when the cover is in position covering the open top of the body. As a result, an air pocket is created at an interface between the cover and the body when the float is positioned in liquid to isolate the interface from the liquid and prevent liquid from entering the hollow interior of the body through the interface.

In another aspect, a buoyant float comprises a body having an interior defined in part by a tubular side wall and a bottom extending inward from the tubular side wall. The side wall has an upper edge defining an open top of the body for providing access to the interior. The upper edge has a relieved segment. The float also comprises a cover sized and shaped for covering the open top of the body. The cover is configured for attachment to the body to maintain the cover in position relative to the body to cover the open top of the body. The cover and the relieved segment of the upper edge of the body form an opening at an interface between the body and the cover to allow fluid to enter into and exit from the body to equalize pressure inside the interior of the body with ambient pressure. In addition, the float has a flexible seal positioned over the opening at the interface between the cover and the body to prevent liquid from entering the hollow interior of the body through the interface.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
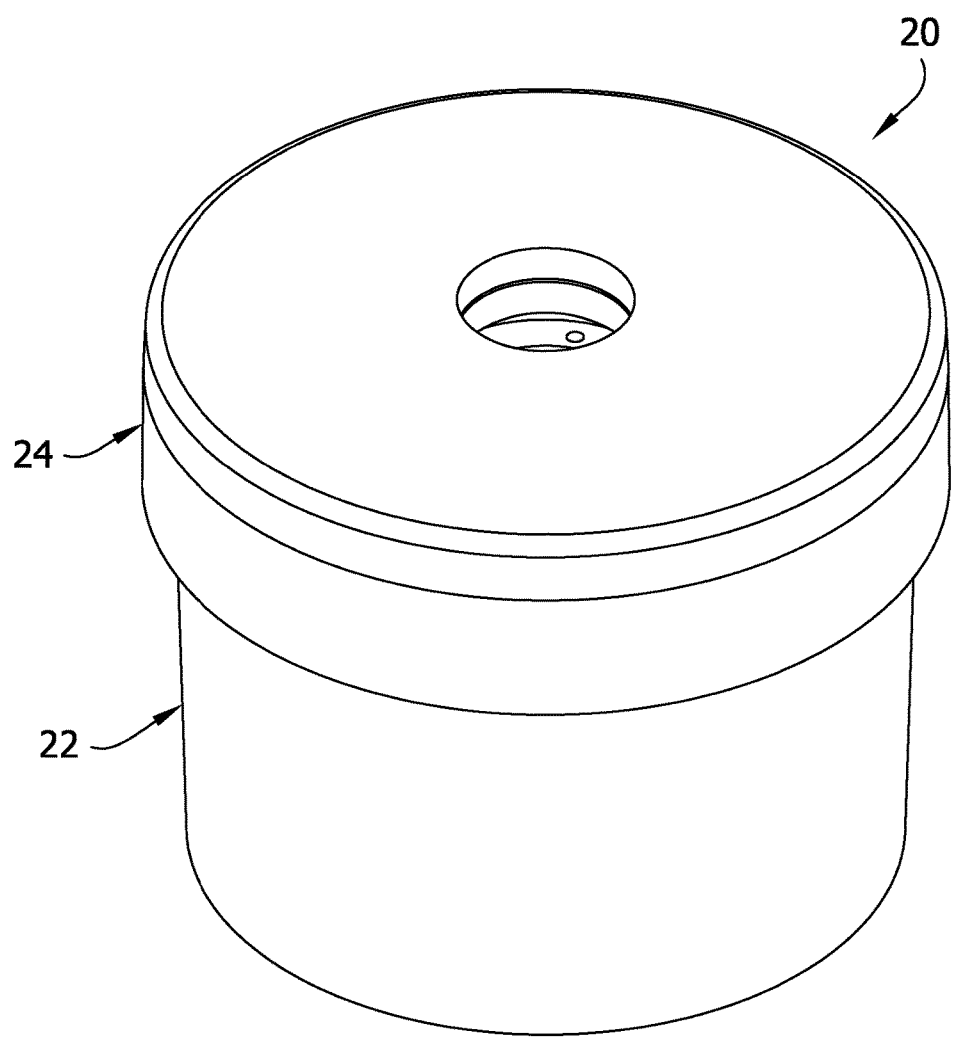
FIG. 1 is a perspective of a float.
Figure 2:
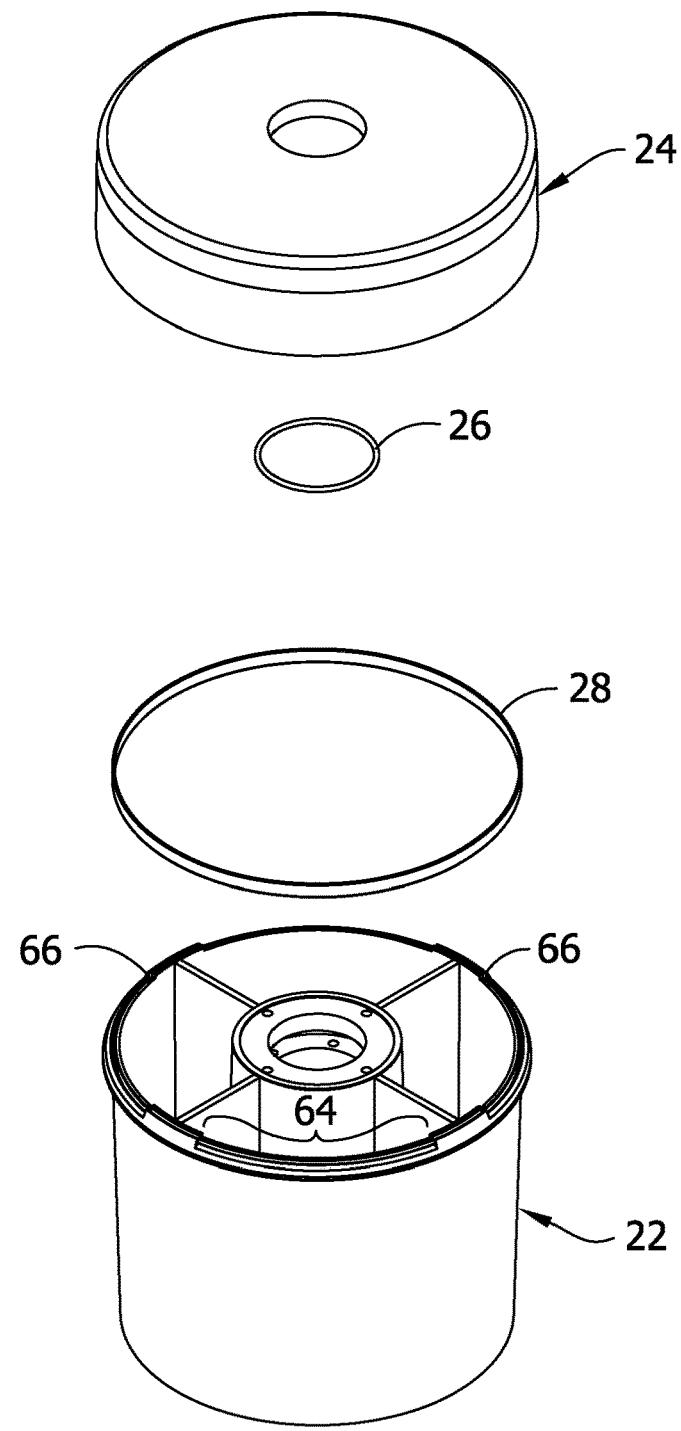
FIG. 2 is a separated perspective of the float.

Referring to FIG. 1, an example of a float is designated in its entirety by the reference number 20. The float 20 generally comprises a body 22 and a cover 24. As illustrated in FIG. 2, the float 20 also includes an inner seal 26 and an outer seal 28 that provide barriers to fluid travel at the interface between the body 22 and cover 24. As will be explained in greater detail below, the inner seal 26 prevents gases and liquids such as air and condensate, respectively, from entering the float 20 via a parting line adjacent a center of the float, and the outer seal prevents liquids such as condensate from entering the float via another parting line at its exterior surface.

Figure 3:
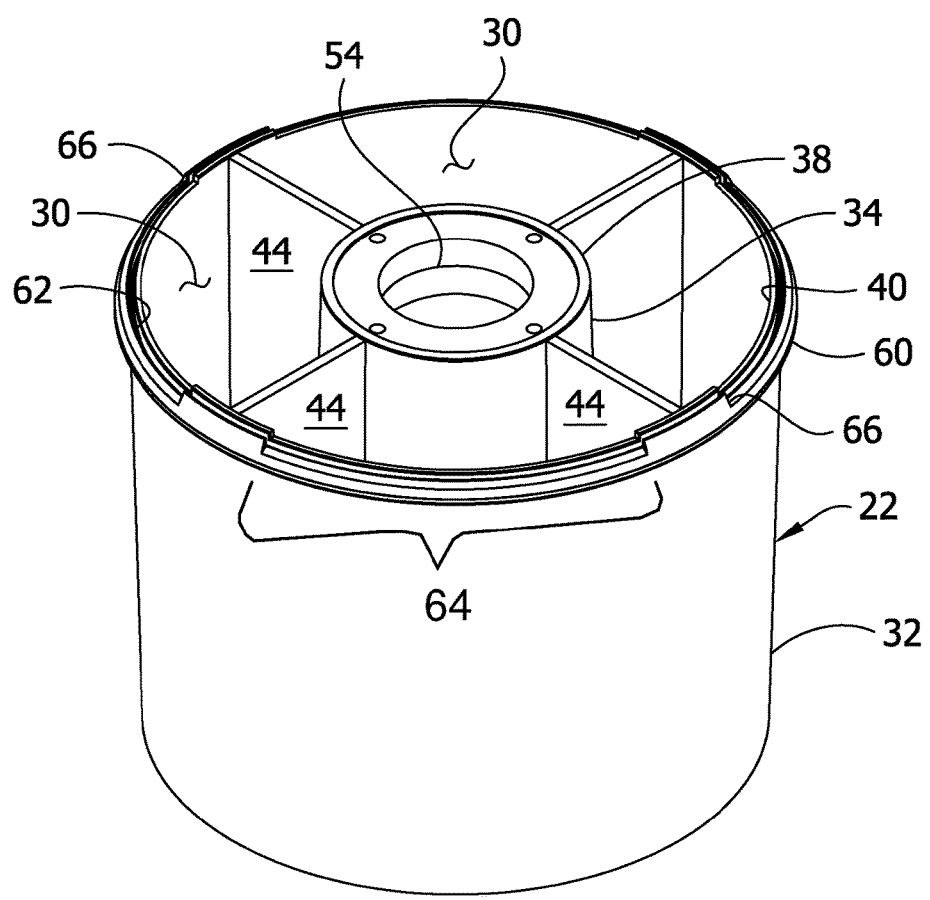
FIG. 3 is a perspective of a body of the float.
Figure 4:
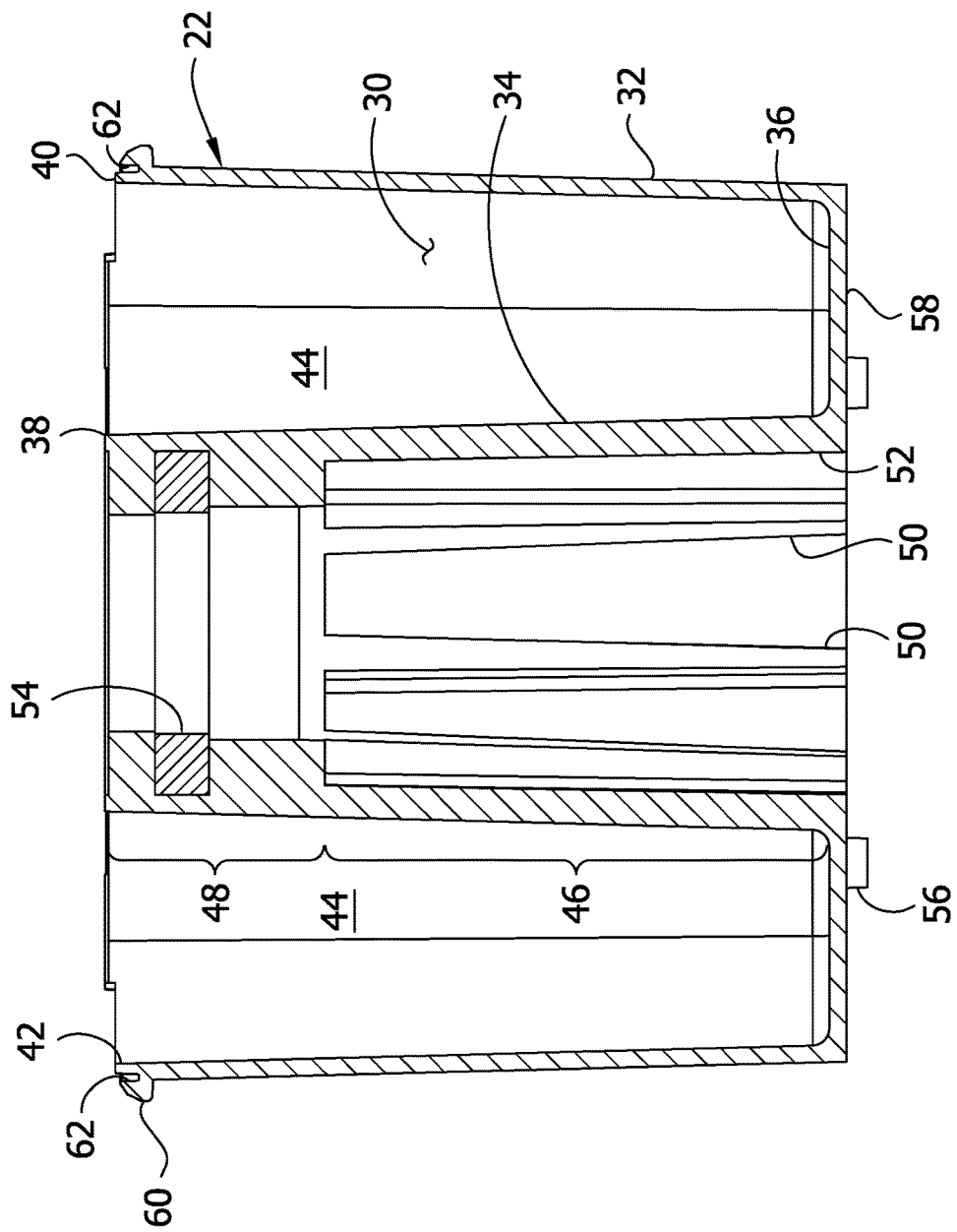
FIG. 4 is an elevational cross section of the body of the float

As shown in FIGS. 3 and 4, the body 22 has an annular hollow interior 30 defined by a tubular side wall 32, a tubular interior wall 34, and a bottom 36 extending across the side wall to the interior wall. The term "tubular" is used herein to have its broadest meaning and does not necessarily require a circular cross section or a length-to-width ratio greater than one. The interior and side walls 34, 32, each have a corresponding upper edge 40, 38, respectively. The upper edges 38, 40 of the interior and side walls 34, 32 bound an open top 42 of the body 22 providing access to the interior 30. Braces 44 are spaced around the hollow interior 30 of the body 22. Each brace 44 extends between the interior wall 34 and the side wall 32 and from the bottom 36 to the open top 42 to provide structural support for the side wall 32. Although other numbers of braces 44 are envisioned, in one example four equally spaced braces are provided between the interior wall 34 and the side wall 32. Referring to FIG. 4, the interior wall 34 of the body 22 has a relatively thinner lower section 46 and thicker upper section 48. Vertical ribs 50 extend inward from an inner surface 52 of the thinner lower section 46 of the interior wall 34 for guiding the float 20 along a tube (not shown) in the drain system (not shown). Although other numbers of ribs 50 are envisioned, in one example six equally spaced ribs extend inward from the interior wall 34. A conventional ring magnet 54 is inserted into the thicker upper section 48 of the inner wall 34 when molding the body 22 to bias an adjacent valve body (not shown) of the drain system (not shown) to enhance operation. As will be appreciated by those skilled in the art, the thicker upper portion 48 of the interior wall 34 reduces stress in the wall around the magnet 54 when the float 20 is used. Pins may be used in the mold to facilitate magnet placement resulting in holes through parts of the thicker upper portion 48 as shown in FIG. 3. As will be appreciated by those skilled in the art, the magnet 54 should be oriented so the magnetic polarity is directed appropriately for the particular application.

As illustrated in FIG. 4, feet 56 extend downward from a lower surface 58 of the bottom 36 to raise the float above a bottom surface (not shown) of the condensate valve (not shown). Although other numbers of feet 58 are envisioned, in one example four equally spaced feet are provided on the bottom 36 of the float 20. Further, a circumferential rib 60 extends outward adjacent the upper edge 40 of the side wall 32 forming a rim for attaching the cover 24 as will be explained in further detail below. As will be understood by those skilled in the art, the rib 60 may have different upper and lower angles as shown. For example, the upper angle may be about 25° relative to vertical as shown to facilitate engagement with the cover 24, and the lower angle may be about 90° relative to vertical to prevent disengagement. A circumferential groove 62 is provided at the upper edge 40 of the side wall 32 for receiving the outer seal 28 during assembly of the float 20. In addition, the upper edge 40 includes relieved segments 64 is shown in FIGS. 2 and 3 that expose more of the outer seal 28 and also create tabs between the sectors 64. In one example, each of the relieved segments 64 are of equal length, but it is envisioned that other configurations could be used. Although other numbers of tabs 66 are envisioned, in one example four equally spaced tabs are created around that the upper edge 40. Further, in one example each of the tabs 66 is centered above one of the braces 44, but other configurations are envisioned.

Figure 5:
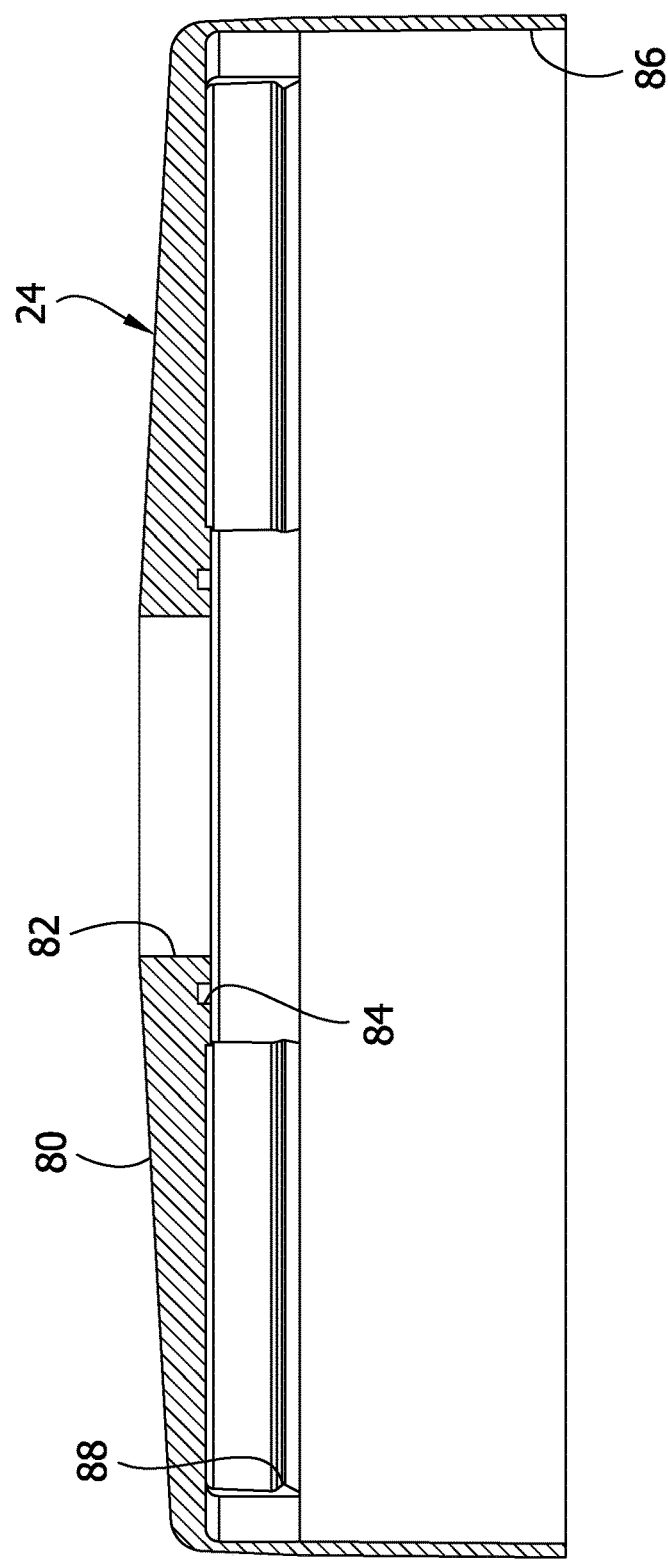
FIG. 5 is an elevational cross section of a cover of the float.
Figure 6:
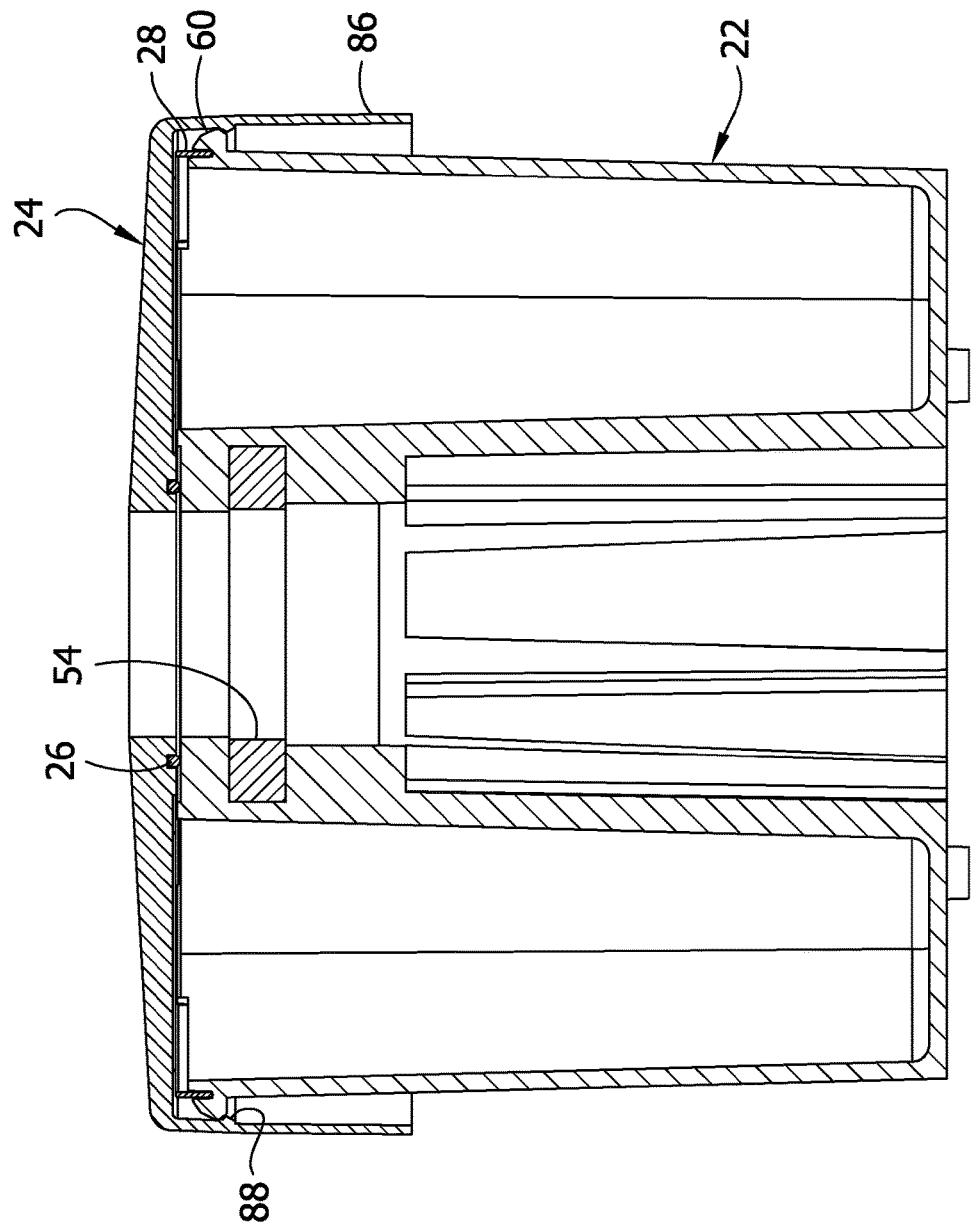
FIG. 6 is an elevational cross section of the float fully assembled.

Referring to FIG. 5, the cover 24 includes a generally planar top 80 having a central opening 82 that aligns with the interior wall 34 of the body 22 when the float 20 is assembled for receiving the previously mentioned tube of the drain system. A circular groove 84 extends upward into the top 80 around the opening 82 for receiving the inner seal 26 during assembly. The cover 24 has a tubular skirt 86 extending downward from a perimeter of the top 80. A rib 88 extends inward from the skirt 86 along segments of the skirt for engaging the rib 60 extending outward adjacent the upper edge of the body 22 during assembly of the float 20. Although it is envisioned that other numbers of ribs may be used, in one example four ribs 88 are equally spaced around the inside of the skirt 86. As will be appreciated by those skilled in the art, the engaged ribs 60, 88 form an annular snap feature for attaching the cover 24 to the body 22. As will also be understood by those skilled in the art, the rib 88 may have different upper end lower angles as shown. For example, the lower angle may be about 30° relative to vertical to facilitate engagement, and the upper angle may be larger to prevent disengagement. The skirt 86 extends downward beyond the rib 88. As shown in FIG. 6, after assembly, the skirt extends downward past the interface between the cover 24 and the upper edge 40 of the side wall 32 of the body 22. Thus, the skirt 86 creates an air pocket around the interface between the cover 24 and the body 22 when the float 20 floats in liquid. As will be appreciated by those skilled in the art, the air pocket isolates the liquid from the interface to prevent liquid from entering the hollow interior 30 of the float 20.

Although the components of the float 20 may be made from other materials, in some examples the body 22 and cover 24 are formed from a rigid molded plastic such as polypropylene. As will be understood by those skilled in the art, the molded components, i.e., the body 22 and cover 24, should have appropriate draft angles to facilitate component manufacture. Although the body 22 and cover are shown as having generally circular cross sections, it is envisioned the body and cover may have other shapes provided they correspond with each other so the cover 24 is sized and shaped for covering the open top of the body. Further, in some examples the inner and outer seals 26, 28, respectively, are made of a suitable flexible elastomeric material. For example, the outer seal 28 may be made of a fluorocarbon having a durometer hardness of about 50.

To assemble the float 20, an outer seal is installed in the groove 62 in the upper edge 40 of the body 22, and an inner seal 26 is installed in the groove 84 provided in the cover 24. Once the seals are installed, the cover 24 and body 22 are oriented as shown in FIG. 2 and brought together until the rib 88 extending inward from the skirt 86 on the cover snaps over the rib 62 extending around the upper edge of the body to attach the cover to the body and fasten the components together. As will be understood by those skilled in the art, the float 20 may be configured to have a known weight that is balanced against the volume of the hollow interior to provide appropriate buoyancy for the particular application.

Openings are formed between the cover 24 and the relieved segments 64 of the upper edge 40 of the side wall 32 of the body 22. The outer seal 28 to deflect away from the cover 24 to permit gas flow through these openings to balance pressures inside and outside the float 20. Balancing these pressures eliminates gas pressure loads on the float due to pressure differentials. Further, the seal 28 will return to its undeflected shape preventing water droplets and splash from entering the float. Therefore, the outer seal and cover skirt can prevent liquid from entering the hollow interior of the float should the float become submerged. Thus, the float 20 is suitable for use in relatively high-pressure systems. For example, floats such as discussed above may be used in systems having gas pressures as high as 170 psi or more. In some examples, it is desirable for the total flow area through these openings be matched to the maximum airflow potential into and out of the drain system. Although it is envisioned that the outer seal 28 may have other thicknesses, in one example the seal has a thickness of about 0.03 inch. It is envisioned that providing pressure balance features as described above will allow a single float to function in systems operating at a large range of pressures.

Although the float is described as being used in combination with a drain system, it is envisioned that the float may be modified for other applications.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A buoyant float, comprising:
    a body having an interior defined in part by a tubular side wall and a bottom extending inward from said tubular side wall, the side wall having an upper edge defining an open top of the body for providing access to the interior; and
    a cover sized and shaped for covering the open top of the body, said cover being configured for attachment to the body to maintain the cover in position relative to the body to cover the open top of the body, said cover having a tubular skirt extending downward and around the upper edge of the body side wall when the cover is in position covering the open top of the body, thereby creating an air pocket at an interface between the cover and the body when the float is positioned in liquid to isolate the interface from the liquid and prevent liquid from entering the hollow interior of the body through the interface;
    wherein the float has an opening along the interface between the cover and the body to allow a pressure inside the interior of the body to equalize with a pressure surrounding the float;
    wherein the float further comprises a flexible seal positioned over the opening at the interface between the cover and the body to prevent liquid from entering the hollow interior of the body through the interface.

2. A buoyant float as set forth in claim 1, wherein the flexible seal deflects away from the cover to allow the pressure inside the interior of the body to equalize with the pressure surrounding the float.

3. A buoyant float as set forth in claim 2, wherein the flexible seal is mounted on the upper edge of the body.

4. A buoyant float as set forth in claim 1, wherein the opening is formed at least in part by a relieved segment of the upper edge of the body.

5. A buoyant float as set forth in claim 1, wherein the body has an outward facing rim adjacent the open top; the skirt has an inward facing rib that engages the rim on the body to fasten the cover to the body.

6. A buoyant float as set forth in claim 1, wherein the body has a tubular central wall extending upward from the bottom of the body inside the side wall.

7. A buoyant float as set forth in claim 6, further comprising a ring magnet mounted on the tubular central wall of the body.

8. A buoyant float, comprising:
    a body having an interior defined in part by a tubular side wall and a bottom extending inward from said tubular side wall, the side wall having an upper edge defining an open top of the body for providing access to the interior, the upper edge having a relieved segment;
    a cover sized and shaped for covering the open top of the body, said cover being configured for attachment to the body to maintain the cover in position relative to the body to cover the open top of the body, wherein the cover and the relieved segment of the upper edge of the body form an opening at an interface between the body and cover; and
    a flexible seal positioned over the opening at the interface between the cover and the body to prevent liquid from entering the hollow interior of the body through the interface, the flexible seal being configured to yield in response to a pressure differential between a pressure inside the interior of the body and a pressure surrounding the float to allow the pressure inside the interior of the body to equalize with the pressure surrounding the float.

9. A buoyant float as set forth in claim 8, wherein the flexible seal deflects away from the cover to allow the pressure inside the interior of the body to equalize with the pressure surrounding the float.

10. A buoyant float as set forth in claim 9, wherein the flexible seal is mounted on the upper edge of the body.

11. A buoyant float as set forth in claim 8, wherein the body has an outward facing rim adjacent the open top; the skirt has an inward facing rib that engages the rim on the body to fasten the cover to the body.

12. A buoyant float as set forth in claim 8, wherein the body has a tubular central wall extending upward from the bottom of the body inside the side wall.

13. A buoyant float as set forth in claim 12, further comprising a ring magnet mounted on the tubular central wall of the body.

* * * * *